Sept. 26, 1939.　　　　　J. C. McCUNE　　　　　2,174,396
BRAKE MECHANISM
Filed April 30, 1937　　　4 Sheets-Sheet 1

INVENTOR
JOSEPH C. McCUNE
BY
ATTORNEY

Sept. 26, 1939.　　　J. C. McCUNE　　　2,174,396
BRAKE MECHANISM
Filed April 30, 1937　　　4 Sheets-Sheet 2

INVENTOR
JOSEPH C. McCUNE
BY　*Wm. N. Cady*
ATTORNEY

Sept. 26, 1939.   J. C. McCUNE   2,174,396
BRAKE MECHANISM
Filed April 30, 1937   4 Sheets-Sheet 4

INVENTOR
JOSEPH C. McCUNE
BY Wm. M. Cady
ATTORNEY

Patented Sept. 26, 1939

2,174,396

UNITED STATES PATENT OFFICE 2,174,396

BRAKE MECHANISM

Joseph C. McCune, Edgewood, Pa., assignor to The Westinghouse Air Brake Company, Wilmerding, Pa., a corporation of Pennsylvania Application April 30, 1937, Serial No. 139,969

46 Claims. (Cl. 188—153)

This invention relates to brake mechanisms, and in particular to brake mechanisms for vehicles, such as railway vehicles, as well as for other power driven apparatus.

The invention will be discussed and described in connection with its application to railway vehicles, where its field of usefulness is of foremost importance. In order to fully and properly understand the nature and character of the invention it is first necessary to also fully understand the more important problems in the railway vehicle brake field which the invention purports to solve. These will be considered from three viewpoints, namely, (1) the problems incident to present type truck and brake rigging designs, (2) the problem of dissipating the heat energy in present brake designs, and (3) the problem of erratic and undesirable friction characteristics with present brake designs.

Truck and brake rigging

In the present designs of trucks and brake rigging employing clasp type brakes, it has been generally considered that with clasp brakes applied the hanger forces tend to balance themselves and exert no particular force toward pulling down the truck frame. It can be shown, however, that this is not actually the case with modern conditions. The brake shoes are, for practical reasons, hung below the horizontal center line of the wheel so that the shoe pressure tends to move each shoe down along the wheel. When the wheel rotates, friction tends to move one shoe up and the other shoe down. If the frictional force exceeds the force tending to move the shoe down along the wheel, then one shoe tends to be carried upward and the other shoe downward. In such a case the hanger forces are roughly balanced, but when stops are initiated at high speeds and with heavy shoe pressures, the frictional force is low so that it can be demonstrated that the frictional force tending to carry the shoe up is less than the shoe pressure tending to move the shoe down. Accordingly, the forces in the brake shoe hangers are both downward. The result is that all the hanger forces tend to pull the truck frame down toward the axle and, as the frame moves down, the distance between the brake shoe and the horizontal center line of the wheel increases, which in turn increases the force pulling down on the brake shoe hangers.

As a result, the truck frame is pulled down until it meets a solid stop, or until the pedestal springs are almost fully compressed. Under this condition, the wheels cannot freely adjust themselves to vertical inequalities in the track rails, and as one or more of the wheels pass over the uneven sections of the rails, or rail joints, they may for an instant leave the rails or have a greatly reduced frictional contact therewith. When this occurs the tendency of such wheels to slide is greatly increased, and since wheel sliding is, for well known reasons, very objectionable it is extremely desirable that the condition referred to be eliminated.

An attempt to relieve this condition by locating one brake shoe above and the other equidistantly below the horizontal centerline of the wheel is not sufficiently effective because such equidistant locations cannot be maintained as the brake shoes wear away, nor is such practicable in many truck designs.

With the present type of brake rigging and brake design, trucks have to be designed with braking reactions in mind and as some of the braking forces are of considerable magnitude, the truck ordinarily has to be reinforced to take these stresses. Accordingly, the weight of the truck is increased.

As indicating the magnitude of these forces, an axle may carry a load of 20 tons. If the braking ratio is 300%, this means a brake shoe pressure of 60 tons. Obviously the forces to be transmitted through the levers and rods of the brake rigging are high, which require large members in the brake rigging itself and reinforcement in the truck to withstand the braking stresses.

Even with a well designed brake rigging the braking efficiency is apt to be surprisingly low. At various times experiments have been made to measure the pressure resulting at the brake shoe from a certain brake cylinder pressure, and it has been found that the shoe pressure is from 75 to 90% of that calculated from the leverage ratio and the cylinder pressure. It can be shown that the radial pressure on the wheel is some 10% less than the pressure measured at the brake shoe. Consequently, under average conditions, the overall rigging efficiency may be of the order of 70%. It is apparent that this inefficiency is of prime concern when heavy braking ratios are employed because of the high braking forces these high ratios connote.

In addition to the loss mentioned above, there is a flunctuation in the precise degree of loss due to the self-energization feature of the brake shoes. If it is desired to brake close to the adhesion point, this fluctuation in rigging efficiency becomes of importance.

From the standpoint of safety, brake rigging has always carried with it a certain hazard due to the possibility of parts falling to the track, and safety hangers are generally used in connection with brake beams.

Again, difficulty may be experienced in releasing the brakes, particularly in winter, because of ice forming on various parts of the brake rigging. The brake can be applied because the ice is pushed aside, but when air is released from the cylinder, the ice prevents the return movement of the brake rigging. This may cause wheel sliding when trains are started, or overheated wheels due to dragging brakes.

Another difficulty with conventional brake rigging is that the shoes drag because of insufficient shoe clearance. It is desired that the piston travel be held to a minimum to reduce air consumption, but on the other hand minimum piston travel means minimum shoe clearance. Conditions may arise where the shoe clearance is such that excessive power is required to start the trains.

To overcome these difficulties heavy release springs are frequently employed in the brake rigging which offset, and sometimes to a very considerable extent, the effect of brake cylinder pressure. In other words, these heavy release springs may reduce the rigging efficiency to an unexpectedly low value.

When the brakes are applied it is desired that the braking force on all wheels be uniform or that intended by the initial design. This is sometimes difficult of practical accomplishment because of space limitations which require different hanger angles, shoe locations, etc.

Furthermore, the brake application may be delayed, due to the heavy mass that must be moved before the brake shoes can exert effective pressure upon the car wheels. Obviously, if this mass has to be moved in a very short time high forces would be required to bring this about, but the forces could not exceed that set up by brake cylinder pistons. Therefore, some time elapses before the shoes contact the wheels. Any loss of this kind is undesirable and becomes very important when making stops from high speeds.

In the present conventional brake systems it is important that brake cylinder piston travel be kept to a minimum. In order that piston travel may be held fairly uniform, present cars are equipped with automatic slack adjusters, or, if these can not be satisfactorily applied, with manual slack adjusters. The difficulties incident to slack adjustment are well known and require no extended comment.

In addition to the mechanical difficulties experienced with present brakes, as above discussed, it is difficult to provide a sufficient supply of air locally for the new high speed trains because of the number of cylinders and the piston travel which takes place in making actual stops. Because of the truck pulling down, as explained above, the running piston travel is in excess of the standing piston travel. The quantity of air required to fill all the cylinders is such that it is difficult to find space for the necessary storage reservoirs.

With the foregoing considerations in mind, it is a general object of the present invention to provide an improved brake mechanism which when applied to railway vehicles will entirely eliminate or greatly minimize the difficulties above set forth.

*Dissipating heat energy*

In the present conventional type brake, the stored energy in the vehicle (or train) is dissipated as heat through the brake shoes and vehicle wheels. The contact area between brake shoes and wheels is relatively small, so that the heat energy is initially concentrated in small areas. The resulting effect upon both brake shoes and wheels has been a source of continued difficulty, and high maintenance cost.

Furthermore, in order to produce a wheel having a reasonably long life its tire or tread must be of a material contributing to such. On the other hand, for braking purposes a different material, having a better thermal capacity and heat radiating characteristic but usually having a shorter life, is more desirable. These characteristics must, however, be sacrificed in order to provide the longer wearing and more rugged wheel, as frequent replacements are detrimental to continued and uninterrupted service to the public.

The structural arrangement of the present clasp brake contributes very poorly to dissipating the heat of braking by either convection or radiation, and opportunities for improvement are greatly limited.

Having in mind the difficulties encountered in present brakes with the proper dissipation of heat, it is a further general object of my invention to provide an improved brake mechanism which due to the arrangement of parts inherently contributes to ready and free dissipation of the heat energy incident to braking, without subjecting the wheels to this heat or in any way affecting their design from this standpoint.

*Friction characteristics*

In order to obtain uniform and smooth stops the friction characteristic between braking elements should be stable throughout the range of speeds over which the vehicle (or train) operates. With present clasp type brakes the friction characteristic has been rather erratic, particularly with brakes on trains operating at high speeds.

For example, it has been observed that when the brakes are applied to a given degree below a certain fairly high vehicle speed, the friction characteristic (i. e., friction plotted against diminishing vehicle speed) takes one form. When the brakes are applied above this vehicle speed the friction characteristic takes a very different form. Because of this it is difficult to so control the brakes as to produce smooth stops, free of objectionable shocks and wheel sliding.

This situation is further complicated in that as the speeds of vehicles and trains increase (as is the present tendency), the opportunity for relief of the situation becomes less and less, because of the limited space available for installation of additional brake shoes, or for increasing the size of present shoes.

Furthermore, from the earliest days warping has been a difficulty with conventional brake shoes because after once being highly heated, warping took place when the shoes cooled, and at the beginning of the next stop the shoe contacted the wheel only at its extreme edges.

Thus it is important that a brake apparatus be developed which will have a stable friction characteristic maintainable over long operating periods following repeated operations. Accordingly, a further object of the present invention is to provide a brake apparatus which can readily be designed to produce a stable friction characteristic and which will during repeated operations maintain this characteristic.

In railway vehicles the wheels are made of a certain kind of cast or rolled metal which may not be changed to assist in producing the best braking characteristics and whilst the composition of the brake shoes may be varied the improvement in such characteristics, due to such variations, has been negligible up to the present time. With this in mind a further object of the invention is to provide a brake apparatus in which the friction faces of all of the braking elements may comprise any suitable composition of metal or any desired friction lining.

While the foregoing objects set forth the main purpose of the invention, other and more detailed objects, dealing with specific constructions and arrangements of parts, will be more fully appreciated from the detailed description of an embodiment of the invention. This embodiment is illustrated in the attached drawings, wherein.

Figure 1:
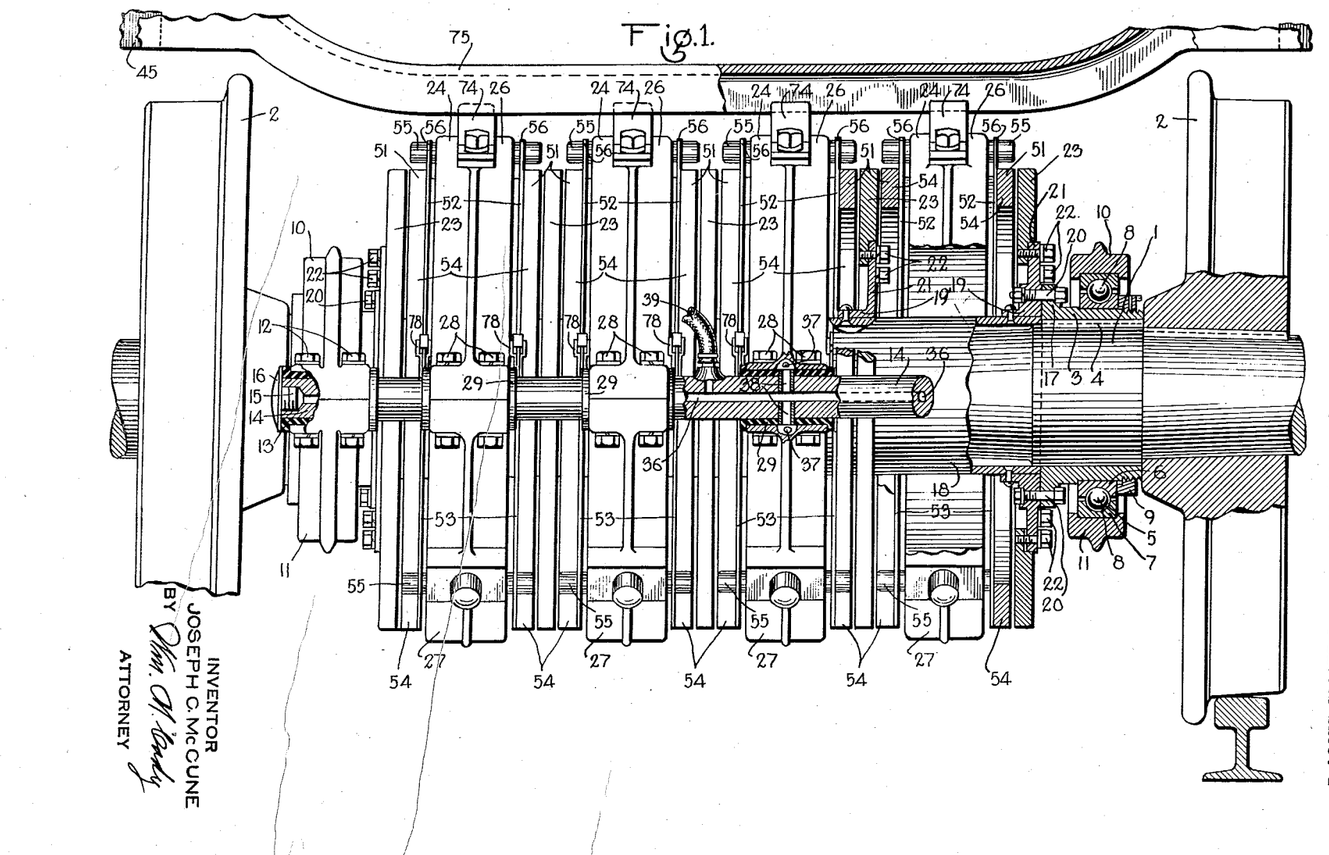
Fig. 1 is an elevational view, partly in section of the brake mechanism applied to one wheel and axle assembly of a railway vehicle.
Figure 2:
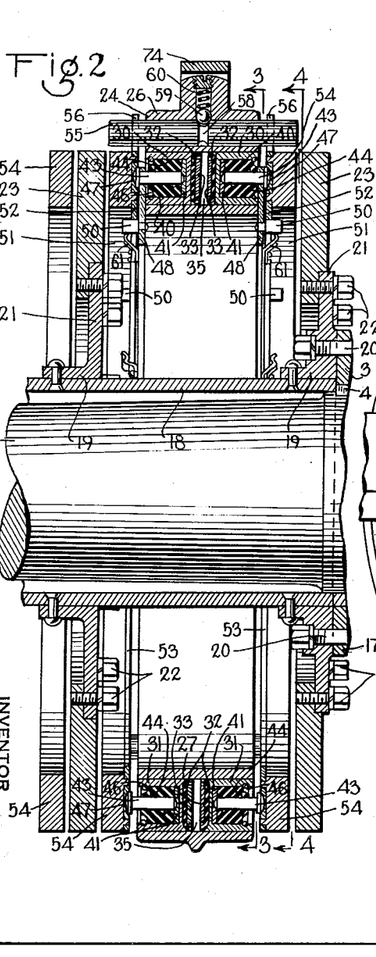
Fig. 2 is a fragmentary longitudinal sectional view of the mechanism taken adjacent one of the vehicle wheels.
Figure 3:
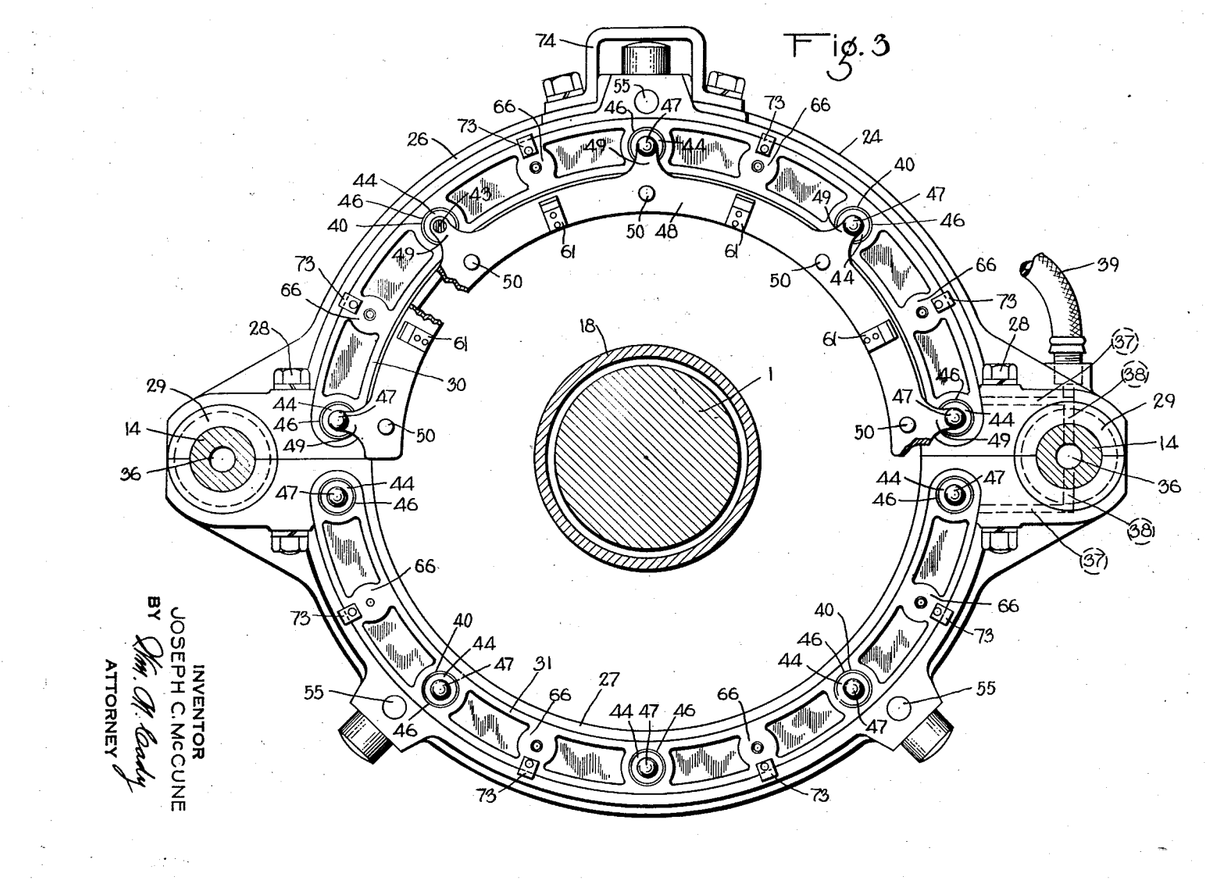
Fig. 3 is a cross-sectional view taken on the line 3—3 of Fig. 2, portions of certain members being broken away to more clearly illustrate other members.
Figure 4:
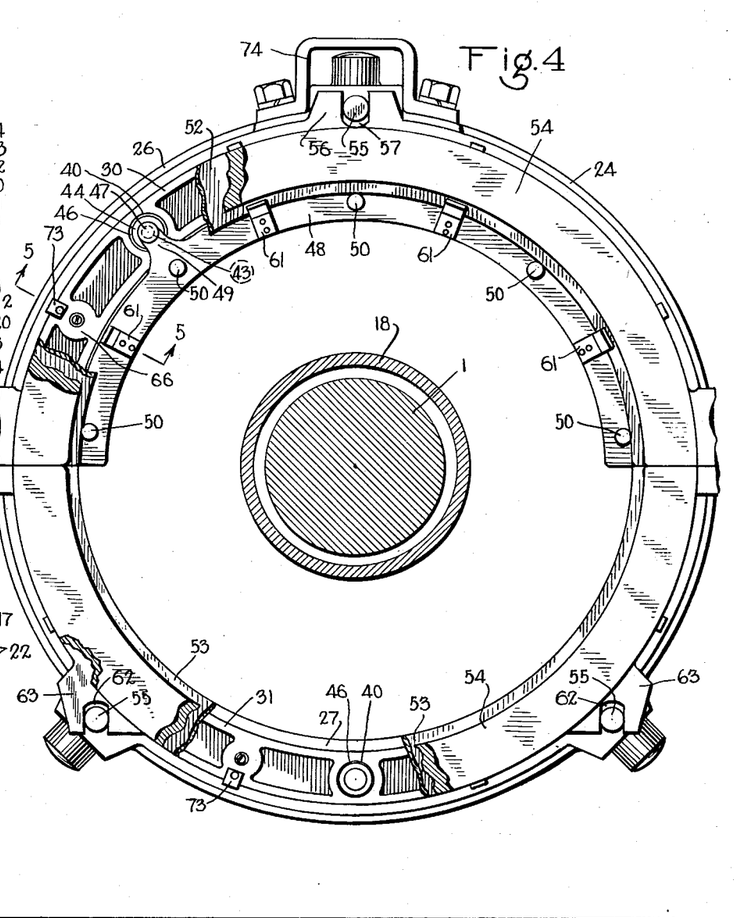
Fig. 4 is a cross-sectional view of the mechanism taken on the line 4—4 of Fig. 2, portions of certain members being broken away to more clearly illustrate other members.
Figure 5:
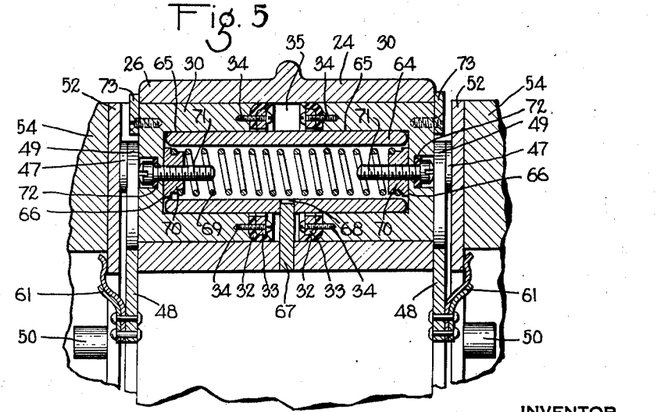
Fig. 5 is a fragmentary sectional view taken on the line 5—5 of Fig. 4.
Figure 6:
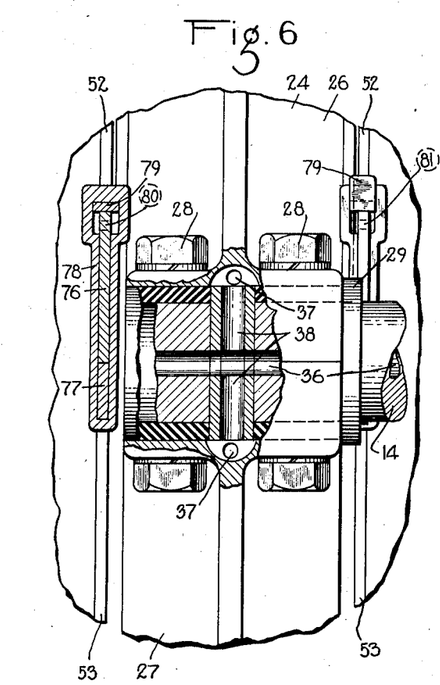
Fig. 6 is an enlarged fragmentary side elevational view, partly in section, of the mechanism and showing a method of fastening certain members of the mechanism together.
Figure 7:
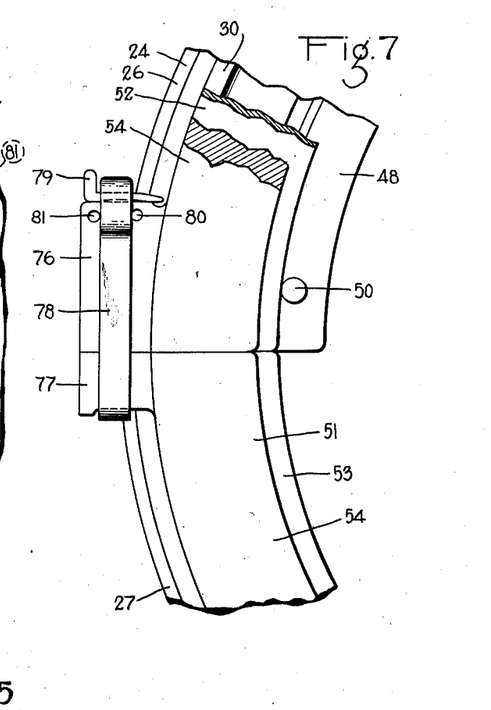
Fig. 7 is an end elevational view of that portion of the mechanism shown in Fig. 6.

In the accompanying drawings my novel brake apparatus has been shown in conjunction with a wheel and axle assembly of a railway vehicle truck, which assembly may comprise an axle 1 having adjacent each end a wheel 2 secured thereto against relative rotation in the usual manner by a press fit or by means of a key or both.

Adjacent each wheel the axle is provided with an enlarged portion on which there is mounted a short sleeve 3 which surrounds the axle and which is secured thereto so as to rotate therewith. In the present embodiment of the invention the sleeve has a light press fit with the axle and is further secured to the axle against relative rotation by means of a longitudinally extending key 4 which is received in suitable keyways provided in both the axle and the sleeve.

Mounted on this sleeve intermediate its ends is an anti-friction bearing 5 of the ball type having an inner ball race member 6, an outer ball race member 7 and ball bearings 8 interposed between and cooperating with the race members in the usual well known manner. The inner race member 6 abuts an annular shoulder provided on the sleeve member and is clamped against this shoulder with such force by a nut 9, having screw-threaded connection with the sleeve, that it will not be permitted to rotate relative to the sleeve.

Carried by the outer race member 7 of the bearing 5 are complementary support members 10 and 11 which are securely clamped to each other and to the outer race member 7 by means of bolts 12 which are arranged two at each side of the bearing 5.

Beyond each pair of bolts 12 the members 10 and 11 clamp in place a bushing 13, preferably made of a rubber composition, which bushing receives one end of a longitudinally extending bar 14 which, in the present embodiment of the invention, extends parallel to the axle 1 and is in the form of a tube which is preferably seamless. The bar 14 extends to the outer face of the bushing and the open end thereof is closed by a plug 15 which has screw-threaded connection with the bar. This plug is provided with a head 16 which seals against the outer face of the bushing 13.

From the foregoing description it will be understood that there are support members 10 and 11 adjacent each wheel and that the bars 14 which are arranged one at each side of the axle 1 and extend parallel therewith connect these sets of support members together. It will also be understood that the heads 16 of the plugs 15, by reason of their engagement with the bushings 13 prevent longitudinal movement of the bars 14 relative to the members 10 and 11.

The inner end of each sleeve 3 is provided with an annular flange 17 which extends outwardly from the sleeve at right angles to the axis of the axle 1.

Surrounding the axle 1 and extending longitudinally thereof between the sleeves 3 is a member 18 which is preferably in the form of a tube which at each end is secured in any desired manner to a sleeve 19 having an annular flange 21 which abuts the flange 17 of the sleeve 3 and which is secured to the flange 17 by means of bolts 20 or any other suitable means.

Outwardly beyond the bolts 20 each flange 21 has removably secured thereto by means of bolts 22 an annular braking element 23 which is preferably made of two segmental pieces.

Evenly spaced longitudinally of the tube 18 and secured thereto between the end sleeves 19 are three other similar sleeves 19' having annular flanges 21 to which the segments of braking elements 23 are removably secured.

Arranged between every two braking elements 23 is an annular brake cylinder device 24 which surrounds the axle 1, there being four of such devices included in the present embodiment of the invention.

Each brake cylinder device comprises upper and lower semicircular brake cylinders 26 and 27, respectively, which are removably clamped together and to the bars 14 by means of bolts 28 there being a yieldable or cushioning sleeve 29 preferably made of a rubber composition, interposed between each bar 14 and the brake cylinders.

Contained in each brake cylinder are two substantially semicircular pistons which are arranged face to face and which, as will hereinafter more fully appear, are movable in opposite directions to each other in effecting either an application or the release of the brakes. The pistons contained in the upper brake cylinder are each indicated by the reference character 30 and the pistons contained in the lower brake cylinder are each indicated by the reference character 31. The pressure face of each piston comprises a packing 32 which is clamped to the face of the piston by means of a plate 33 which is secured to the piston by machine screws 34. Between each pair of pistons 30 and 31 there is a chamber 35 which is connected to a passage 36 in one of the bars 14 through a passage 37 and a passage 38 in a nipple secured to the bar 14 and extending through the rubber cushion or sleeve 29. It should here be mentioned that the diameter of the passages 37 adjacent the ends of the nipples is made greater than that of the nipples to provide enough clearance between the nipples and the brake cylinder device so that the nipples will not interfere with the compression of the rubber bushings or sleeves 29.

The passage 36 in the bar 14 is connected to a fluid pressure supply and release conduit 39 which as shown is preferably connected to the bar at a point intermediate the two centrally located brake cylinder devices.

Each upper brake cylinder piston is provided at intervals throughout its length with recesses 40 which are open at the rear end of the piston. Contained in each recess is a bearing or wear plate 41 which abuts the face wall of the piston and which is provided centrally with a concavity which is adapted to receive the correspondingly shaped inner end of a strut 43 which is secured in a yieldable support 44 preferably made of a rubber composition, contained in the recess, which support is secured to the piston by means of a snap ring 46 carried by the piston interiorly of the recess. The strut 43 extends outwardly beyond the end of the piston and at its outer end is provided with a head 47.

Located at the rear end of each of the pistons 30 is a semi-circular plate 48 having radially disposed outwardly extending ears 49 which are provided with openings through which the piston struts 43 extend, said ears constituting hangers for the plate. This plate adjacent its lower edge is provided with spaced, radially arranged, laterally extending support lugs 50.

Interposed between each plate 48 and the adjacent rotatable braking element 23 is an annular braking element 51 which comprises upper and lower semi-circular plates 52 and 53, respectively, which are securely clamped together in the manner hereinafter more fully described, each of which plates has rigidly attached thereto a semi-circular wear member 54 for braking engagement with one side of the element 23.

The upper semi-circular plate 52 rests on the support lugs 50 carried by the plate 48 and in turn supports the lower semi-circular plate 53.

The head of each brake cylinder strut 43 engages the adjacent face of the brake element 51 preferably within a recess which is provided in said face.

Each of the upper brake cylinders is provided with a pin 55 which extends longitudinally of the brake cylinder and is of such length that the ends thereof project beyond each end of the brake cylinders and into the vertical plane of the adjacent plates 52, each plate having an outwardly extending lug 56 which is provided with a notch 57 for the reception of the pin. This pin has a sliding fit with the brake cylinder and intermediate its ends, is provided with a circular groove 58 into which a detent member, preferably in the form of a ball 59, is urged by the action of a spring 60, said ball serving to normally hold the pin in its proper position and yet permitting the pin to be driven longitudinally in one direction or the other when, as will hereinafter more fully appear, it is desired to remove the braking element 51.

The inner edge of the plate 52 is held in place with relation to the plate 48 by means of spring clips 61 which are secured to lower edge portion of the plate 48 and which overlie and engage the plate 52.

Each of the lower brake cylinders is provided with two pins 55 which are mounted in the brake cylinder in the same manner as the corresponding pin carried by the upper brake cylinder. These pins, in the lower brake cylinder, are radially arranged and their projecting ends extend into notches 62 provided in lugs 63 projecting outwardly from the periphery of the plate 53.

It will here be noted that the pins 55 carried by the upper brake cylinder and the lugs 50 carried by the plate 48 are so arranged that they lock the braking element 51 in its proper position. The pins 55 carried by each of the lower brake cylinders are for the purpose of preventing the plate 53, which may become disconnected from its companion plate 52, from falling on the track where it is liable to cause damage to the vehicle or track. The pins 55 carried by the upper and lower brake cylinders are also for the purpose of holding the braking element 51 against rotation about the axle 1.

Each pair of brake cylinder pistons is provided with a plurality of identical release mechanisms which are alternately arranged with respect to the brake cylinder struts 43. Each of these release mechanisms may comprise a guide member which is in the form of a tube 64 which extends across the space between the faces of the pistons and into aligned recesses 65 formed in the pistons, each end of the tube terminating adjacent the inner surface of a wall 66 of one of the pistons when the pistons are in their normal release position. The guide member 64 is held against longitudinal movement by means of a pin 67 which is secured to the brake cylinder and which engages the guide member within an opening 68 in the member. Contained in the tube 64 is a release spring 69 which is anchored at each end to a spring seat 70 secured to the adjacent wall 66 of a piston by means of a screw 71, there being a gasket 72 interposed between the head of the screw and the wall to prevent leakage of fluid from the pressure chamber 35 of the brake cylinder. The spring 69 is initially tightly wound so that when the pistons are in their normal release position and the screws 71 are turned home, the spring will be stretched sufficiently that it will act to maintain the pistons in this position. The tubes 64 form guides for the pistons and are especially adapted to counteract any tendency of the pistons to cock in the brake cylinders. In this connection it will be noted that since the tubes 64 extend into recess in both pistons and has sliding engagement therewith each piston serves to support the other against cocking while the pistons are in application position or while moving to or from this position. If desired the tube may be made to form a stop for limiting the release movement of the pistons, however, I prefer to provide each piston with a plurality of separate stops 73 which are adapted to engage the brake cylinder before the pistons engage the ends of the tubes 64 thus protecting the pin 67 against damage.

In the present embodiment of the invention each of the upper brake cylinders is provided with an outwardly extending exterior stop 74 which may be integral with the brake cylinder or which, as shown, may be in the form of an inverted U-shaped strap member secured to the brake cylinder. Those stops 74 are adapted to be engaged by a fixed part 75 of the vehicle truck to prevent rotation of the brake cylinder devices and braking elements operated thereby. In the drawings the part 75 is shown as extending transversely of the truck and as being secured at each end to one of the usual truck side frames 45 but it will be understood that the stops 74 may be made to engage any other desired fixed part of the truck frame. While the stops 74 have been shown as being carried by the upper brake cylinders it is to be understood that they may be carried by the lower brake cylinders or any other stationary part of the assembly. The location of the stops will depend upon the construction of the truck and the clearances about the assembly.

It has heretofore been mentioned that the semi-circular plates 52 and 53 of the braking element 51 are securely clamped together and this may be done in any desired manner. In the present embodiment of the invention I have shown one suitable clamping mechanism which will now be described. The plate 52, at each end, is provided with an outwardly extending lug 76 and the plate 53, at each end, is provided with a lug 77 which is in vertical alignment with the lug 76. Extending around the lugs 76 and 77 is a yoke 78 and interposed between the upper surface of the lug 76 and the adjacent inner surface of the yoke 78 is a wedge key 79 which cooperates with the yoke and lug 76 to clamp the lugs 76 and 77 securely together. The lower edge of the lug 77 is recessed to receive the lower end of the yoke and to hold it in place. The upper edge of the lug 76 is provided with a recess into which the inner end of the key is adapted to deflect when the key is driven home in position so as to secure the upper end of the yoke in position. When it is desired to clamp the plates together a pin (not shown) is first inserted in an opening 80 provided in the lug 76, then the yoke 78 is placed around both lugs 76 and 77 and finally the wedge key 79 is driven between the yoke and the lug 76. During the time the key is being driven into its proper position the pin, which has been inserted in the opening 80, will prevent the upper end of the yoke from moving inwardly with the key, thus the proper positioning of yoke and key is insured. When the yoke is in its clamping position the sides thereof maintain the plates 52 and 53 in alignment with each other. After the key 79 has been driven to its proper position the pin which has been inserted in the openings 80 is removed. When it is desired to disconnect the plates 52 and 53 a pin is first inserted in an opening 81 provided in the lug 76, then the key 79 is driven out of engagement with the yoke. By thus holding the yoke against movement with the key, removal of the key is facilitated. After the key has been removed the pin may be removed from the opening 81.

When it is desired to remove a braking element 51 of the assembly for repairs or replacement, the yokes 78 are first removed from the lugs 76 and 77 at the ends of the plates 52 and 53 in the manner just described, then the pins 55 carried by the adjacent brake cylinder are driven to one side out of the vertical plane of the plates. When the pins carried by the lower brake cylinder are thus positioned the plate 53 will drop from the assembly and when the pin carried by the upper brake cylinder is thus positioned the plate 52 is adapted to be lifted out of the spring clips 61 secured to the plate 48. When the plates 52 and 53 are replaced each of the pins 55 are driven back to their normal locking positions.

In operation, when the vehicle is in motion and the brakes released, the tube 18 and braking elements 23 will rotate with the axle 1, while the brake cylinder assembly which is carried by the anti-friction bearings 5 through the medium of the bars 14 and support members 10 and 11 will be maintained against rotation by the engagement of the fixed part 75 of the truck with the stops 74.

The rubber bushings or sleeves 29 interposed between the brake cylinder devices and the bars 14, and the rubber bushings or sleeves 13 interposed between these bars and the members 10 and 11, are adapted to absorb shocks set up in the apparatus and at the same time prevent noises which would otherwise be present when the vehicle is in motion.

When it is desired to effect an application of the brakes, fluid under pressure is supplied, by means of any suitable apparatus, through conduit 39 to passage 36 in one of the bars 14. From this passage fluid under pressure flows through passages 38 and 37 to the piston chambers 35 of the upper and lower brake cylinders of each brake cylinder device and causes the pistons of each brake cylinder to move outwardly in opposite directions to each other. As the pistons are thus moved the piston struts 43 which form direct driving connections between the pistons and the braking elements 51 move said elements 51 into braking engagement with the rotating braking elements 23. When the braking elements 51 are thus moved into engagement with the braking elements 23 there will be a tendency for the elements 51 to rotate with the elements 23 which, if the struts 43 were rigidly secured to the brake cylinder pistons would tend to cause each piston to bind against one end of the brake cylinder. However, since the struts 43 are cushioned in the rubber members 44 the tendency of the pistons to bind in the brake cylinders is eliminated.

It will be noted that since the tube 18 which carries the rotatable braking elements 23 is only connected to the sleeves 3, the braking torque of the apparatus will be applied to the axle 1 adjacent each wheel thus leaving the comparatively long intermediate portion of the axle free of braking torque. By reason of this the axle may be made considerably lighter than would otherwise be the case.

The tube 18 besides serving to transmit braking torque to the axle as just described also serves as a safety device in that it will prevent the axle from dropping to the track if for any reason the axle should break.

When it is desired to release the brakes fluid under pressure is released from the brake cylinder chambers 35 through the passages 37, 38 and 36 and conduit 39 whereupon the release springs 69 act to return the pistons to their normal release positions. As the pistons are thus moved the heads 47 of the struts 43, acting through the medium of the plate 48 and spring clips 61 move the braking elements 51 out of engagement with the rotatable braking elements 23 and to their normal release position.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a brake apparatus, in combination, a rotatable member to be braked, spaced supports for said member, an annular braking element located between said supports and encircling said member, said element being secured to said member adjacent each of said supports and being rotatable by said member, a braking member movable into braking engagement with said element, and piston means for actuating said braking member, said piston means comprising a piston, a strut rockably engaging said piston and braking member and movable by said piston for actuating the braking member, and means yieldably securing said strut to said piston.

2. In a brake apparatus, in combination, a rotatable member to be braked, spaced supports for said member, an annular braking element located between said supports and encircling said member, said element being secured to said member adjacent each of said supports and being rotatable by said member, a braking member movable into braking engagement with said element, and piston means for actuating said braking member, said piston means comprising a piston, a strut rockably engaging said piston and braking member and movable by said piston for actuating the braking member, means yieldably securing said strut to said piston, and means carried by said strut for supporting said braking member.

3. In a brake apparatus, in combination, a rotatable member to be braked, spaced supports for said member, an annular braking element located between said supports and encircling said member, said element being secured to said member adjacent each of said supports and being rotatable by said member, a braking member movable into braking engagement with said element, and piston means for actuating said braking member, said piston means comprising a piston, a strut rockably engaging said piston and braking member and movable by said piston for actuating the braking member, means yieldably securing said strut to said piston, and means carried by said strut for securing said braking member to said piston.

4. In a brake apparatus, in combination, a rotatable member to be braked, spaced supports for said member, a plurality of spaced brake cylinder devices encircling said member, supporting means for said brake cylinder devices carried by said member adjacent each of said supports, means for maintaining the supporting means against rotation by said rotatable member, a tubular member encircling said rotatable member and encircled by said brake cylinder devices, said tubular member being secured to said rotatable member adjacent said supports and being rotatable by the member, a single annular braking element arranged between each two brake cylinder devices and secured to said tubular member, an annular braking member interposed between each brake cylinder device and one side of each braking element movable by said piston device into braking engagement with the braking element by the adjacent brake cylinder device, and means for supporting the braking elements from the brake cylinder devices.

5. In a braking apparatus, in combination, a rotatable member to be braked, spaced supports for said member, a tubular member located between said supports and encircling said member, said tubular member being secured to said rotatable member adjacent said supports, to rotate with the rotatable member, a braking element secured to said tubular member adapted to rotate therewith, two brake cylinder devices encircling said tubular member and arranged one on each side of said braking element, means supporting said brake cylinder devices from said member at points adjacent said supports, means for preventing said brake cylinder devices and supporting means from rotating with said member, and an annular braking member located between each brake cylinder device and said braking element operative by the brake cylinder device into braking engagement with said braking element, each of said braking members encircling said tubular member and being supported by the adjacent brake cylinder device.

6. In a brake apparatus, in combination, a rotatable member to be braked, spaced supports for said member, an annular braking element secured to said member and being rotatable thereby, an annular braking member movable into braking engagement with said braking element, a pair of semi-circular brake cylinders clamped together to encircle said member, and a semi-circular piston in each of said brake cylinders movable in a direction longitudinally of said rotatable member for actuating said braking member.

7. In a brake apparatus, in combination, a rotatable member to be braked having secured thereto an annular braking element rotatable therewith in a fixed plane and having a braking surface on each side thereof, a pair of non-rotatable annular braking members movable into braking engagement with opposite sides of said element, and a fixed brake cylinder device encircling said rotatable member, and having a plurality of substantially semi-circular pistons movable longitudinally of the rotatable member for actuating each of said braking members.

8. In a brake apparatus, in combination, a rotatable member to be braked having secured thereto an annular braking element rotatable therewith in a fixed plane and having a braking surface on each side thereof, a pair of non-rotatable annular braking members movable into braking engagement with opposite sides of said element, and a fixed brake cylinder device encircling said rotatable member, and having a plurality of substantially semi-circular pistons movable longitudinally of the rotatable member for actuating each of said braking members, and means carried by one of said pistons for supporting said braking member.

9. In a brake apparatus, in combination, a rotatable member to be braked having secured thereto an annular braking element rotatable therewith in a fixed plane and having a braking surface on each side thereof, a non-rotatable braking member arranged on each side of said element and movable into braking engagement therewith, a brake cylinder device encircling and carried by said rotatable member having a pair of semi-circular pistons movable in a direction longitudinally of said rotatable member to actuate each of said braking members, means for maintaining each brake cylinder against rotation by said rotatable member, and means carried by one piston of each pair for supporting an adjacent braking member.

10. In a brake apparatus, in combination, a pair of spaced vehicle wheels, an axle carried by said wheels and being rotatable thereby, an annular braking member encircling said axle and being rotatable therewith in a fixed plane, an annular braking member encircling said axle movable longitudinally of the axle into braking engagement with said braking element, a brake cylinder device encircling said axle operative by fluid under pressure for actuating said braking member and for maintaining the braking member against rotation, and means for maintaining the brake cylinder device against rotation.

11. In a brake apparatus, in combination, a pair of spaced vehicle wheels, an axle carried by said wheels and being rotatable thereby, an annular braking member encircling said axle and being rotatable therewith in a fixed plane, an annular braking member encircling said axle movable longitudinally of the axle into braking engagement with said braking element, a brake cylinder device encircling and carried by said axle operative by fluid under pressure for actuating said braking member, means for maintaining said brake cylinder device against rotation with said axle, and means carried by the brake cylinder device for maintaining said braking member against rotation about the axle.

12. A braking unit for a pair of wheels secured to the opposite ends of an axle, said axle having adjacent each wheel a portion of enlarged diameter, an element extending between and secured to the enlarged portions of said axle, a plurality of members to be braked spaced along and secured to said element for rotation with said wheels, means interposed between each adjacent pair of said elements and journaled on the enlarged portions of said axle comprising braking members disposed in braking relation with the adjacent members to be braked, and fluid pressure operative means for moving said braking members into braking engagement with said members to be braked, and means securing the first named means against rotation.

13. A braking unit for a pair of wheels secured to the opposite ends of an axle, said axle having adjacent each wheel a portion of enlarged diameter, a plurality of members to be braked spaced along said axle between said wheels and secured to the enlarged portions of said axle for rotation therewith, braking means interposed between each adjacent pair of said members and movable into braking engagement therewith, a movable abutment for each braking means operative by fluid under pressure for moving the respective braking means into braking engagement with the respective member to be braked, means carried by said wheels carrying the movable abutments and braking means, and means securing the last named means against rotation.

14. A braking unit for a pair of wheels secured to the opposite ends of an axle comprising a plurality of members to be braked spaced along said axle between said wheels and secured to said wheels for rotation therewith, means disposed between each adjacent pair of said members movable into braking engagement therewith, a movable abutment for each of said means operative by fluid under pressure for moving the means into braking engagement with the respective member, means journaled on said axle carrying the several movable abutments and the braking means operative thereby, and means securing the last named means against rotation.

15. A braking unit for a pair of wheels secured to the opposite ends of an axle comprising a plurality of members to be braked spaced along said axle between said wheels and secured to said wheels for rotation therewith, braking means disposed between each adjacent pair of said members for braking said members and journaled on said axle adjacent each of the wheels, and means for holding said braking means against rotation, each of said braking means comprising a segmental circular braking element disposed in braking relation with the side face of the adjacent member to be braked, and means for applying a uniformly distributed pressure over the area of one face of the several braking elements for pressing the opposite face thereof into braking engagement with the respective member to be braked.

16. A braking unit for a pair of wheels secured to the opposite ends of an axle comprising a plurality of members to be braked spaced along said axle between said wheels and secured to said wheels for rotation therewith, braking means disposed between each adjacent pair of said members for braking said members and journaled on said axle adjacent each of the wheels, and means for holding said braking means against rotation, each of said braking means comprising a segmental circular braking element having one face movable into frictional engagement with the side face of the adjacent member to be braked, movable abutment means for each of said braking means of substantially the same size and contour as said braking means and having one face engaging the opposite face of said braking means, said movable abutment means being operative by fluid under pressure applied to the opposite face for moving the respective braking means into frictional engagement with the adjacent member to be braked, and means operative upon the release of fluid under pressure from said abutment means to move said braking means out of engagement with the members to be braked.

17. A braking unit for a pair of wheels secured to the opposite ends of an axle comprising a plurality of alternately spaced members to be braked secured to and rotatable with said wheels, and fluid pressure operated means for braking said members journaled on said axle, a tube spaced from and extending longitudinally of said axle to which each of said fluid pressure operated means is secured, said tube having an axial bore to and from which fluid under pressure is adapted to be supplied and released, each of said fluid pressure operated means having passageways open to said bore through which fluid under pressure is adapted to be supplied and released for controlling the operation thereof in accordance with the pressure of fluid in said bore, and means for securing said fluid pressure operated means against rotation.

18. A braking unit for a pair of wheels secured to the opposite ends of an axle comprising a plurality of alternately spaced members to be braked secured to and rotatable with said wheels, and fluid pressure operated means for braking said members journaled on said axle, a tube spaced from and extending longitudinally of said axle and having an axial bore to and from which fluid under pressure is adapted to be supplied and released, each of said fluid pressure operated means comprising two sections secured together and to said rod and having passageways open to said bore through which fluid under pressure is adapted to be supplied thereto and released therefrom for controlling the operation thereof, and means securing said fluid pressure operated means against rotation.

19. In a fluid pressure braking apparatus, in combination, two spaced rotatable braking members, two non-rotatable braking elements movable in directions away from each other into braking engagement with said rotatable braking members and movable toward each other out of braking engagement with said rotatable braking members, aligned movable abutments movable in directions away from each other by fluid under pressure for moving said braking elements into braking engagement with said braking members, spring means extending between and secured to both of said abutments adapted to move the abutments toward each other upon the release of fluid under pressure acting thereon for moving said braking elements out of braking engagement with said braking members, and guide means for said abutments arranged adjacent said spring means.

20. In a fluid pressure braking apparatus, in combination, two spaced rotatable braking members, two non-rotatable braking elements movable in directions away from each other into braking engagement with said rotatable braking members and movable toward each other out of braking engagement with said rotatable braking members, aligned movable abutments movable in directions away from each other by fluid under pressure for moving said braking elements into braking engagement with said braking members, spring means extending between and secured to both of said abutments adapted to move the abutments toward each other upon the release of fluid under pressure acting thereon for moving said braking elements out of braking engagement with said braking members, and tubular guide means for said abutments surrounding said spring means.

21. In a braking unit for a pair of spaced oppositely disposed wheels of a railway vehicle truck, a rigid structure extending between and rigidly connected at opposite ends to said wheels for rotation therewith, a member to be braked secured for rotation with said rigid structure, a supporting structure located between said wheels and journaled on and supported by said rigid structure, means for engagement with a fixed part of the truck for maintaining said supporting structure against rotation with said wheels, and means carried by said supporting structure and adapted to frictionally engage with said member to brake the member, said means being maintained against rotation by the supporting structure.

22. In a braking unit for a pair of spaced oppositely disposed wheels of a railway vehicle truck, a rigid structure extending between and rigidly connected at opposite ends to said wheels for rotation therewith, a member to be braked secured for rotation with said rigid structure, a supporting structure carried by said rigid structure, said supporting structure comprising spaced end pieces journalled on and carried by said rigid structure, members extending longitudinally of the assembly and carried by said end pieces, fluid pressure actuated means carried by said members for frictional braking engagement with said member to be braked, and means associated with said supporting structure adapted to cooperate with a fixed part of the truck for maintaining the supporting structure against rotation with said rigid structure.

23. In a braking unit for a pair of spaced oppositely disposed wheels of a railway vehicle truck, a rigid structure extending between and rigidly connected at opposite ends to said wheels for rotation therewith, a member to be braked secured for rotation with said rigid structure, a supporting structure carried by said rigid structure and comprising spaced end pieces journalled on and carried by said rigid structure, supporting members extending longitudinally of said rigid structure and carried by said end pieces, said members being located outwardly beyond the periphery of the member to be braked, means removably clamped to said supporting members for frictional braking engagement with the member to be braked, and means associated with said supporting structure adapted to cooperate with a fixed part of the truck for maintaining the supporting structure against rotation with said rigid structure.

24. A braking unit for a pair of wheels secured to the opposite ends of an axle, said unit comprising a member to be braked located between said wheels and secured for rotation with said axle, a support structure carried by said axle, said support structure comprising spaced end pieces arranged one on each side of the member to be braked and journalled on said axle, members extending longitudinally of the assembly and carried by said end pieces, said members being spaced outwardly from the periphery of the member to be braked, fluid pressure controlled means encircling said axle and removably carried by said support members for frictional braking engagement with the member to be braked, and means associated with said supporting structure adapted to cooperate with a fixed part of the truck for maintaining said support structure and thereby the fluid pressure controlled means against rotation with the assembly.

25. In a brake mechanism for a wheel and axle assembly of a railway vehicle truck, in combination, a brake supporting structure located between the wheels of said assembly and carried by the assembly, said supporting structure comprising spaced end pieces journalled on the assembly, spaced members spanning the space between said end pieces and being carried by the end pieces, means cooperating with the supporting structure and a fixed part of the vehicle truck for maintaining the structure against rotation with the assembly, a friction brake element encircling said axle and secured for rotation with said assembly, said element being located in the space between said end pieces and members, an annular non-rotatable brake element for frictional braking engagement with the first mentioned brake element, said non-rotatable brake element encircling said axle, and fluid pressure responsive means encircling said axle and carried by said supporting structure operative to effect the frictional braking engagement of the brake elements with each other, said fluid pressure responsive means comprising a plurality of segmental brake cylinder sections removably clamped together, in end to end relation in the form of an annulus for the accommodation of said axle, and to said spaced members to facilitate the assembly, removal and replacement of the fluid pressure responsive means independently of the supporting structure and without interference by the supporting structure and axle.

26. In a brake mechanism for a wheel and axle assembly of a railway vehicle truck, in combination, a brake supporting structure located between the wheels of the assembly and carried by the assembly, said supporting structure comprising spaced end pieces journalled on said assembly, each of said end pieces comprising a pair of complementary parts removably clamped together and to said assembly, spaced support members spanning the space between said end pieces and clamped at each end between the complementary parts of the adjacent end piece, means cooperating with said supporting structure and a fixed part of the vehicle truck for maintaining the structure against rotation with the assembly, a friction brake element encircling said axle and secured for rotation with said assembly, said element being located in the space between said end pieces and members and comprising a plurality of complementary segmental pieces, removably secured together in end to end relation, the greatest dimensions of each of said segmental pieces being less than the distance between said support members to facilitate the assembly, removal and replacement of said segmental pieces without interference by the support members, an annular brake shoe located between said brake element and one of said end pieces of the supporting structure for frictional braking engagement with said brake element, said brake element encircling the axle of said assembly and comprising a plurality of segmental pieces removably secured together in end to end relation to form an annulus for the accommodation of said axle, and fluid pressure responsive means encircling said axle and carried by said supporting structure operative to effect the frictional braking engagement of the brake shoe and element with each other, said fluid pressure responsive means comprising a plurality of segmental brake cylinder devices clamped to said spaced members of the supporting structure and to each other in end to end relation to facilitate the assembly, removal and replacement of the brake cylinder devices without interference by the supporting structure and wheel and axle assembly.

27. In a brake mechanism for a wheel and axle assembly of a railway vehicle truck, in combination, a brake supporting structure located between the wheels of said assembly and carried by the assembly, said supporting structure comprising spaced end pieces journaled on the assembly, spaced members spanning the space between said end pieces and being carried by the end pieces, means cooperating with the supporting structure and a fixed part of the vehicle truck for maintaining the structure against rotation with the assembly, a friction brake element encircling said axle and secured for rotation with said assembly, said element being located in the space between said end pieces and members, an annular non-rotatable brake element for frictional braking engagement with the first mentioned brake element, said non-rotatable brake element encircling said axle, and fluid pressure responsive means encircling said axle and carried by said supporting structure operative to effect the frictional braking engagement of the brake elements with each other, said fluid pressure responsive means comprising a plurality of segmental brake cylinder sections having at their meeting ends outwardly extending end lugs adapted to be clamped on the spaced members of said supporting structure, and removable means for drawing said lugs together into clamping engagement with said spaced members.

28. In a vehicle brake, in combination, a rotatable member to be braked, a sleeve disposed axially of and secured to said member for rotation therewith, an annular rotatable friction braking element secured to said sleeve for rotation with said member, an annular non-rotatable friction braking element adapted to be moved into frictional engagement with said rotatable element for braking said member, and a brake cylinder device journaled on and carried by said sleeve and operatively connected to said non-rotatable element for controlling the movement thereof.

29. A brake for a vehicle wheel comprising in combination, a sleeve secured to rotate with said wheel in concentric relation therewith, an annular rotatable friction braking element secured rigidly to said sleeve, an annular non-rotatable friction braking element adapted to be moved into frictional braking engagement with said rotatable element for braking said wheel, and an annular brake cylinder device encircling said sleeve and journaled axially on and supported by said sleeve adjacent said rotatable element and operatively connected to said non-rotatable element for controlling movement thereof.

30. A brake for a vehicle wheel comprising in combination, a sleeve secured to rotate with said wheel in concentric relation therewith, an annular rotatable friction braking element secured rigidly to said sleeve, an annular brake cylinder device encircling said sleeve and journaled on and carried by said sleeve adjacent said rotatable element, and a non-rotatable friction braking element carried by said brake cylinder device in cooperative relation with said rotatable element, and movable by said brake cylinder device into frictional braking engagement with said rotatable element for braking said wheel.

31. A brake for a vehicle wheel comprising in combination, a sleeve secured to rotate with said wheel, a pair of oppositely disposed annular rotatable friction braking elements rigidly secured to said sleeve in spaced relation, an annular brake cylinder device encircling said sleeve between said elements and journaled and supported axially on said sleeve, a non-rotatable friction braking element disposed between each of the opposite sides of said brake cylinder device and the adjacent rotatable element adapted to be moved into frictional engagement with said rotatable elements for effecting braking of said wheel, and means operatively connecting said brake cylinder device to said non-rotatable elements for controlling movement thereof, said non-rotatable elements and brake cylinder device being formed in separable, substantially semi-circular sections, and removable means rigidly securing the sections of said brake cylinder device together in the form of an annulus.

32. A brake for a vehicle wheel comprising in combination, a sleeve secured to rotate with said wheel, a pair of oppositely disposed annular rotatable friction braking elements rigidly secured to said sleeve in spaced relation, an annular brake cylinder device disposed between said elements journaled and supported axially on said sleeve, a non-rotatable element disposed between each of the opposite sides of said brake cylinder device and the adjacent rotatable element, and means operatively connecting said brake cylinder device and said non-rotatable elements for controlling movement of said non-rotatable elements into frictional braking engagement with said rotatable elements.

33. A brake for a vehicle wheel and axle assembly, in combination, a brake element encircling the axle of said assembly and secured for rotation therewith, a non-rotatable brake element movable into braking engagement with the rotatable brake element, and non-rotatable means journaled on and supported by said rotatable brake element operative to actuate said non-rotatable brake element.

34. A brake for a vehicle wheel and axle assembly, in combination, a brake element encircling the axle of said assembly and secured for rotation therewith, a non-rotatable brake element movable into braking engagement with the rotatable brake element, fluid pressure responsive means journaled on and supported by said rotatable brake element and operative to actuate said non-rotatable brake element, and means for maintaining said fluid pressure responsive means against rotation with the rotatable brake element.

35. A brake for a vehicle wheel and axle assembly, in combination, a brake element encircling the axle of said assembly and secured for rotation therewith, said element comprising spaced braking disks and a tubular portion connecting said disks and encircling the axle of said assembly, a non-rotatable member journaled on said tubular portion, non-rotatable braking disks carried by said member, and fluid pressure responsive means carried by said member operative to effect frictional braking interengagement of said disks.

36. In a brake mechanism for a pair of laterally spaced wheels of a vehicle truck, an annular rotatable friction braking element and an annular non-rotatable friction braking element located between said wheels and adapted upon frictional braking interengagement to brake said wheels, a rigid structure extending between and secured for rotation with said wheels and carrying said rotatable brake element for rotation therewith, a non-rotatable structure having spaced bearings on said rotatable structure and carrying said non-rotatable brake element, and means carried by the non-rotatable structure between said bearings and operative to effect the frictional braking interengagement of the brake elements.

37. In a brake mechanism for a pair of laterally spaced wheels of a vehicle truck, annular rotatable friction braking elements and annular non-rotatable friction braking elements adapted upon frictional interengagement to brake said wheels, a rigid structure extending between and connected to said wheels and carrying said rotatable braking elements for rotation with said wheels, a pair of support members spaced longitudinally of and carried by said rigid structure and carrying said non-rotatable braking elements, and a member rigidly connecting said support members together and to a central transverse portion of said truck for holding said support members and non-rotatable braking elements against rotation with said rotatable braking elements.

38. In a brake mechanism for a pair of laterally spaced wheels of a vehicle truck, an annular rotatable friction braking element and an annular non-rotatable friction braking element adapted upon frictional braking interengagement to brake said wheels, a rigid structure extending between and connected to said wheels, a sleeve-like structure encircling and secured to said rigid structure and carrying said rotatable braking element, a pair of support members spaced longitudinally of and journaled on said sleeve-like structure and carrying said non-rotatable brake element, and means connecting said support members with said truck for holding said support members and non-rotatable brake element against rotation with said rotatable brake element.

39. In a brake mechanism for a wheel and axle assembly of a railway vehicle truck, an annular rotatable friction braking element and a non-rotatable friction braking element adapted upon frictional braking interengagement to brake said assembly, means securing said rotatable brake element to said assembly for rotation therewith, a pair of support members spaced longitudinally of and having journal connections with said assembly for supporting said non-rotatable braking element in braking relation with said rotatable braking element, and means cooperating with said support members and truck for holding the non-rotatable braking element against rotation.

40. In a brake mechanism for a pair of laterally spaced wheels of a railway vehicle truck having a frame supported on said wheels and comprising a transversely extending member, an annular rotatable friction braking element and an annular non-rotatable friction braking element adapted upon frictional braking interengagement to brake said wheels, a rigid structure extending between and connected to said wheels and carrying said rotatable braking element for rotation with said wheels, a pair of spaced support members carried by said rigid structure and carrying said non-rotatable braking element, and means rigidly connecting said support members together and connected to said transversely extending frame member for holding said non-rotatable brake element against rotation.

41. In a brake mechanism for a pair of laterally spaced wheels of a vehicle truck having a truck frame supported on said wheels, annular rotatable friction braking elements and non-rotatable braking elements adapted upon frictional interengagement to brake said wheels, a rigid structure connected to said wheels supporting said rotatable braking elements for rotation with said wheels, another rigid structure journaled on the first named rigid structure supporting said non-rotatable braking elements, and means providing a connection between the last named structure and a central transverse portion of said truck frame for holding the said last named structure and said non-rotatable braking elements carried thereby against rotation with said rotatable braking elements.

42. In a brake mechanism for a pair of laterally spaced wheels of a vehicle truck having a truck frame supported on said wheels, annular rotatable friction braking elements and non-rotatable friction braking elements adapted upon frictional interengagement to brake said wheels, a rigid structure connected to said wheels supporting said rotatable braking elements for rotation with said wheels, a pair of spaced support members journaled on said rigid structure supporting said non-rotatable braking elements, each of said support members comprising two oppositely disposed complementary sections encircling and journaled on a bearing provided on said structure, a rigid member connected at one end to the sections of one support member and at the opposite end to the sections of the other support member for holding the sections of said support members together, and means providing a connection between said rigid member and said truck frame for securing said support members and non-rotatable braking elements against rotation with said rotatable braking elements.

43. In a brake apparatus, in combination, a wheel and axle assembly for a railway vehicle truck, an annular braking element arranged in concentric relation with said assembly and rotatable therewith in a fixed plane, an annular braking member arranged in concentric relation with said assembly and movable longitudinally thereof into braking engagement with said rotatable element, a brake cylinder device arranged in concentric relation with said assembly operative by fluid under pressure for actuating said braking member and for maintaining said braking member against rotation, and means for maintaining said brake cylinder device against rotation.

44. In a brake apparatus, in combination, a wheel and axle assembly for a railway vehicle truck, an annular braking element arranged in concentric relation with said assembly and rotatable therewith in a fixed plane, an annular braking member arranged in concentric relation with said assembly and movable longitudinally thereof into braking engagement with said rotatable element, a brake cylinder device arranged in concentric relation with said assembly operative by fluid under pressure for actuating said braking member and for supporting and maintaining said braking member against rotation, and means for maintaining said brake cylinder device against rotation.

45. In a brake apparatus, in combination, a wheel and axle assembly for a railway vehicle truck, an annular braking element arranged in concentric relation with said assembly and rotatable therewith in a fixed plane, an annular braking member arranged in concentric relation with said assembly and movable longitudinally thereof into braking engagement with said rotatable element, a brake cylinder device arranged in concentric relation with said assembly operative by fluid under pressure for actuating said braking member and for maintaining said braking member against rotation, and means cooperating with a part of the truck for maintaining the brake cylinder device against rotation.

46. In a brake apparatus, in combination, a wheel and axle assembly for a railway vehicle truck, an annular braking element arranged in concentric relation with said assembly and rotatable therewith in a fixed plane, an annular braking member arranged in concentric relation with said assembly and movable longitudinally thereof into braking engagement with said rotatable element, a brake cylinder device arranged in concentric relation with said assembly carrying said braking member and operative by fluid under pressure to actuate said braking member, and means for maintaining said brake cylinder device and braking member against rotation.

JOSEPH C. McCUNE.